United States Patent [19]
Willich et al.

[11] 3,891,199
[45] June 24, 1975

[54] HYDRAULIC SHOCK ABSORBER

[75] Inventors: Jean Herbert Willich; Christian Pfeil, both of Ennepetal, Germany

[73] Assignee: Firma August Bilstein, Ennepetal-Altenvoerde, Germany

[22] Filed: Sept. 21, 1972

[21] Appl. No.: 290,854

[30] Foreign Application Priority Data
Aug. 2, 1972 Germany............................ 2237914

[52] U.S. Cl. ................ 267/139; 188/289; 188/298; 188/315; 188/322; 267/64 R
[51] Int. Cl. ........................... F16f 9/08; F16f 9/342
[58] Field of Search .......... 188/280, 282, 281, 298, 188/289, 311, 315, 322; 267/35, 64 R, 136, 139

[56] References Cited
UNITED STATES PATENTS

| 721,303 | 2/1903 | Hoff............................... | 188/280 X |
| 2,436,573 | 2/1948 | Heynes............................ | 267/64 R |
| 3,392,849 | 7/1968 | Rasmussen...................... | 188/282 X |
| 3,419,114 | 12/1968 | Rumsey .......................... | 188/287 X |
| 3,525,449 | 8/1970 | Zanow ............................ | 188/281 X |
| 3,774,895 | 11/1973 | Willich et al..................... | 267/64 R |

FOREIGN PATENTS OR APPLICATIONS
1,299,286  6/1962  France............................... 188/322

*Primary Examiner*—George E. A. Halvosa
*Attorney, Agent, or Firm*—Neuman, Williams, Anderson & Olson

[57] ABSTRACT

A hydraulic shock absorber comprising two telescopically movable tubes containing damping liquid and a resilient bag encircling the tubes and receiving damping liquid expelled from the tubes through throttling ports upon telescopic compression of the tubes is made adjustable in respect of its damping characteristics by the provision of an adjustable setting device which extend through one end of one of the tubes and which may include a screw-fitted element. Adjustment of the throttling ports may be effected by a plate, disc, or tapered pin being moved relative to ports. The invention also provides a shock absorber with a two-stage or three-stage throttling action, whether or not the shock absorber has adjustability, by providing two or three separate areas of throttling control in the shock absorber, these areas being connected hydraulically in series and/or in parallel.

9 Claims, 10 Drawing Figures

PATENTED JUN 24 1975
SHEET 1
3,891,199

HYDRAULIC SHOCK ABSORBER

FIELD OF THE INVENTION

This invention relates to hydraulic shock absorbers.

The invention relates to a hydraulic shock absorber comprising two telescopically movable tubes containing damping liquid, and a resilient bag secured to and encircling the tubes, the bag being arranged to receive damping liquid expelled from the tubes through throttling port means upon telescopic compression of the tubes and returning after the compression stroke to its pre-compression position.

The damping properties of such shock or impact absorbers, particularly the way in which the damping force is made available in dependence on the stroke or upon the speed of the object which is to be stopped; are determined by the construction and disposition of the component parts. An alteration in the damping properties by using other component parts or by reconstructing existing component parts is expensive and time-consuming.

DESCRIPTION OF THE PRIOR ART

An adjustable piston comprising an outer cylinder and an inner cylinder movable therein is already known, in which a rotatable but not longitudinally displaceable adjustment sleeve is provided in the annular space between the outer and inner cylinders, which sleeve can mask outlet slots in the inner cylinder to a greater or lesser extend. The adjustment sleeve is actuated by an adjustment ring encircling and penetrating through the outer cylinder and must be provided with adjustment slots corresponding to the outlet slots in the inner cylinder. The manufacture of the known shock absorbers is expensive. The principle of adjustability transversely through the sleeve surface of the essentially cylindrical structural elements is not used or is only used at high cost in the known hydraulic shock absorbers of the type first mentioned above because of the presence of the resilient bag on the outside of the shock absorber.

SUMMARY OF THE INVENTION

It is one object of the present invention to provide a shock absorber of the kind first mentioned above, that is, comprising two telescopically movable tubes encircled by a resilient liquid-tight bag, which has an adjustability which is obtained by simple constructional means. Within the permissible load limits, all damping forces should be adjustable, so that the shock absorber can be adapted to the most varied damping tasks in industry, vehicles, and so on.

It is a further object of the invention to provide a shock absorber which has a two-stage or three-stage throttling action governed by two or three separate throttling areas within the shock absorber. Such shock absorbers may or may not have the above-mentioned feature of adjustability.

Thus, in accordance with one aspect of the invention there is provided a hydraulic shock absorber comprising two telescopically movable tubes containing damping liquid, and a resilient bag secured to and encircling the tubes, the bag being arranged to receive damping liquid expelled from the tubes through throttling port means upon telescopic compression of the tubes and returning after the compression stroke to its pre-compression position, and the cross-section of said throttling port means throttling the damping liquid upon a compression stroke being adjustable by setting means extending sealingly through the end of one of said tubes.

It is important for this aspect of the invention that the effective cross-sectional area of the throttling port means can be adjusted by a setting member. The setting member, by penetrating through the end of the tub, can then be operated from the outside, that is, without dismantling the shock absorber. The sealing of the setting member can easily be accomplished since it is at rest during an actual damping operation.

The setting member is preferably co-axial with the telescopically movable tubes, and preferably the effective cross-section of said throttling port means is exclusively dependent on the axial position of said setting means. Having a co-axial arrangement of the setting member facilitates a simple construction, particularly with shock absorbers having a control pin or a row of holes to form the throttling port means of the shock absorber. One-part structural elements provided additionally with only one setting member can be used, whereby exact manufacture can be controlled by simple operating steps. This applies particularly if the varying cross-sections are exclusively dependent on the alteration of the axial position of the setting member, which for example can be easily achieved by a screw fitting in the end wall of one tube. A nut which can be screwed up tight against the end wall may be used as a securing member to prevent rotation of the setting member, particularly with setting members incorporating screw means.

According to one embodiment of the invention there is provided a shock absorber in which the throttling port means comprises a control plate dividing the interiors of the two tubes from one another and a displaceable hollow control member carried by the outer tube and determining the effective cross-section of throttling control aperture through the control plate, and in which the setting means comprises a needle positioned within the control member and adjustable to alter the effective cross-section of a transverse bore connecting the hollow interior of the control member with the interior of the outer tube. In addition to the passage for liquid between the control plate and the control member, a simply adjustable by-pass may be provided by means of which the course of the damping force can be altered.

According to a further embodiment of the invention there is provided a shock absorber in which said throttling port means comprises a hollow control member carried by the outer tube and having throttling ports therethrough distributed over a distance equal to the maximum stroke length, and a control plate which closes the inner end of the inner tube and sealingly engagingly receives the control member therethrough, and in which said setting means comprises a longitudinally adjustable tapered pin fitted within the control member and of a length greater than said maximum stroke length. According to the formation of the taper of the surface of the pin, this affects the flow to one or more of the throttling ports. The damping characteristic can thereby be influenced not only in the sense of a reduction in the damping force, as in the case with a by-pass, but the damping can also be made harder.

According to another embodiment of the invention there is provided a shock absorber in which said throttling port means comprises a plurality of throttling ports formed through one of said tubes and arranged to be covered by the other of said tubes sequentially upon telescopic compression, and in which said setting means comprises a plate which is longitudinally adjustable within said one tube and which peripherally engages the inner wall of said one tube over a predetermined tube length, said plate being effective to vary the flow cross-section by being movable to mask a further throttling opening through said one tube. Such a formation of the adjustability of the shock absorber is particularly favourable if it suffices to draw up only the last of the throttling ports already provided for the purpose of adjustment.

If, in a shock absorber in which said throttling port means comprises an aperture through one of said tubes and a spring-loaded plate in said one tube and slidingly co-operate with said aperture, and in which said setting means is operative to alter the tension of the spring loading said plate, then the shock absorber can be so adjusted that it only begins to operate after exceeding a certain impact energy. This is desirable for example if one wishes to make certain that for impacting objects with high energy the entire compression stroke is available and that this has not already been reduced by a previous slow load.

According to yet another embodiment of the invention, there is provided a shock absorber in which the throttling port means comprises a plurality of throttling ports formed through one of said tubes and arranged to be covered sequentially by the other of said tubes upon telescopic compression, and in which said setting means comprises a rotatable disc within said one tube arranged to selectively mask an opening through said one tube which is additional to said ports. The rotatable disc can rest against the inner surface of the end wall carrying the setting member and can transfer the forces arising from the internal pressure on operating the shock absorber directly to the casing, without the positioning and the sealing of the setting member in the end wall being additionally affected. Its mounting in the end wall is thereby simplified. The sealing of the setting member may be effected by a sealing ring carried by a bearing shaft of the setting means. In order to protect the damping adjustment means, preferably the end of the tube through which the setting means extends includes protective sleeve housing encircling and extending the length of the projecting setting means. The sleeve housing may include means, such as a screw thread, to fix a suitable impact head thereon.

According to another feature of the invention, the throttling port means may comprise an aperture in one of said tubes and a spring-loaded member which is operative to block said aperture. Then, the shock absorber operates in the manner of an excess-pressure valve, particularly if the impact energy exceeds a certain value.

Preferably, the liquid passage defined by the spring-loaded member and the aperture is arranged hydraulically in series or parallel with second aperture means formed by a plurality of throttling ports in one of said tubes which are arranged to be sequentially masked, or by throttling slots, or by a control plate dividing the interiors of the two tubes and having a control member displaceably received therethrough.

Preferably, the second aperture means are arranged in series with said liquid passage defined by the spring-loaded member, and third liquid aperture means are arranged in parallel with said second aperture means.

According to another aspect of the invention there is provided a hydraulic shock absorber comprising two telescopically movable tubes containing damping liquid, and a resilient bag secured to and encircling the tubes, the bag being arranged to receive damping liquid expelled from the tubes through throttling port means upon telescopic compression of the tubes and returning after the compression stroke to its pre-compression position, said throttling port means comprising an aperture in one of said tubes and a spring-loaded member which is operative to block said aperture, and the liquid passage defined by the spring-loaded member and the aperture being arranged hydraulically in series or parallel with second aperture means which effect a throttling function.

BRIEF DESCRIPTION OF THE DRAWINGS

A number of embodiments of the invention will now be described by way of example and with reference to the accompanying drawings, which.

DESCRIPTION OF THE PREFERRED EMBODIMENTS

Figure 1:
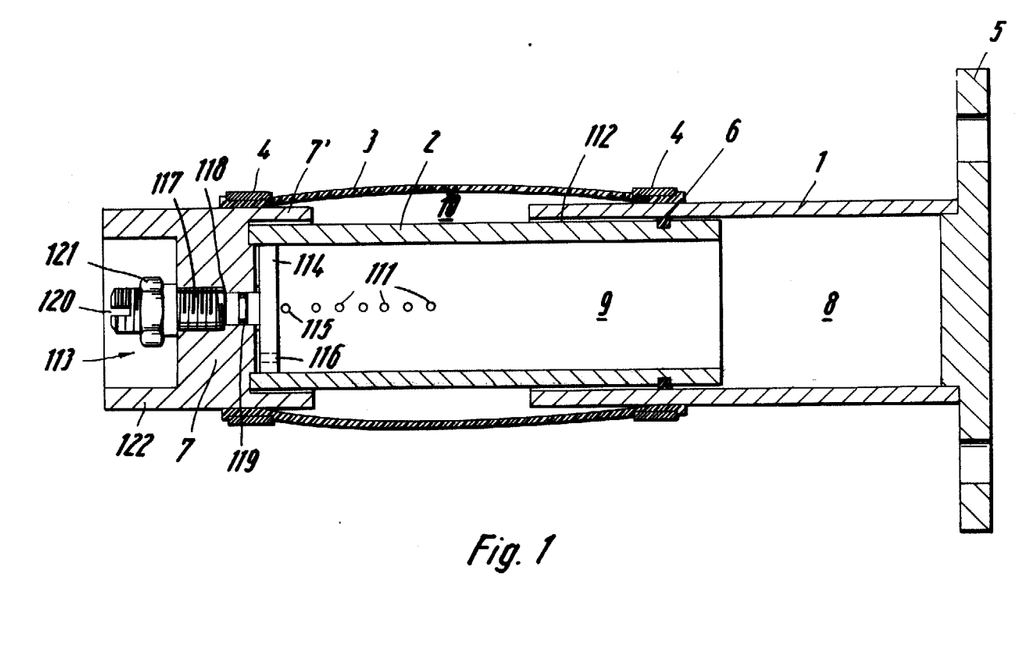
FIG. 1 is a longitudinal sectional view through a first embodiment of hydraulic shock absorber having a series of throttling ports, the port next to the headpiece of the inner tube being arranged to be completely or parallely masked in use, by a sliding plate.

The shock absorber shown in FIG. 1 comprises two telescopic tubes 1 and 2, the outer tube 1 being closed at its outer end by a fastening flange 5 and the inner tube 2 being closed at its outer end by a headpiece 7. A resilient bag 3, which is preferably formed as a tubular rolling bag with fabric inserts, connects the tubes 1, 2 in such a way that damping liquid present in inner chambers 8, 9 and 10 of the shock absorber is enclosed and sealed off from the ambient surroundings of the shock absorber. Thus, the bag 3 is secured at one end to the exterior surface of the other tube 1 and is secured at the other end to the headpiece 7 of the inner tube 2 or to a collar 7', the securement at each end being effected by a clamping ring 4. The inner chambers 8, 9 of the shock absorber are only connected to the inner chamber 10 enclosed by the resilient bag 3 by means of throttling ports 111. The annular clearance 112 between the two tubes 1, 2 is made hydraulically ineffectual by a sealing ring 6 in order to exclude its effect on the damping characteristic. A setting member 113 is mounted in the headpiece 7. It consists essentially of a disc 114 which co-operates with a throttling port 115 which is additional to the throttling ports 111. The disc 114 has a relief bore 116 therethrough so that upon shock-absorbing operation the setting member 113 is not subjected to the full internal pressure of the tubes 1, 2. The disc 114, which is displaceable in a longitudinal direction, is carried by a bearing shaft 118 which, towards the end carrying the disc, is fitted with a sealing ring 119. Towards the other, actuating end, the shaft 118 is screw-threaded at 117, by means of which it can be adjusted like a screw relative to the headpiece 7.

Various setting positions of the disc 114 can be obtained by rotating the bearing shaft 118 with a tool (not shown) fitted into a slot 120 in the end of the shaft. Since the disc 114 peripherally engages the inner wall of the tube 2 to a tube length determined by the diameter of the additional port 115, the free cross-section of this throttling port 115 depends only upon the degree to which it is overlapped by the disc in a longitudinal direction, and does not dpend upon the rotational position of the disc. The fixing of various set positions is achieved by a nut 121, which can be screwed up tightly on the bearing shaft outwardly of the headpiece 7. The outer end of the bearing shaft and the nut 121 of the setting member 113 are protected against damage, displacement or the like by a sleeve portion 122 which extends from the outer end of the headpiece 7 in an axial direction beyond the end of the bearing shaft.

The shock absorber shown in FIG. 1 operates as follows. Upon impact of an object against the end of a tube, the inner tube 2 for example is pushed into the outer tube 1. Since the volume of the inner chambers 8 and 9 is reduced, the damping liquid held under a pressure greater than atmospheric passes immediately through the throttling ports 111 into the inner chamber 10 surrounded by the resilient bag 3. The resilient bag 3 is thereby expanded and reaches its maximum permissible extension as the maximum permissible compression stroke is completed. The resilient bag can then effect the restorative movement of the shock absorber, whereby it presses the damping liquid back into the inner chambers 8, 9 of the tubes 1, 2. The bag is formed, in a manner which is not shown, with plies of fabric as inserts, which not only results in continual elasticity, retention of its external form for receiving the damping liquid, and manufacture with a dirt-resistant outer layer and an oil-resistant inner layer, but also serves as an end stop upon outward relative movement of the tubes one from the other. It is to be understood that the restorative movement of the shock absorber can alternatively be effected by a spring acting between the two tubes, so that the bag does not necessarily have to have inherent restorative properties.

The dissipation of impact energy takes place when the damping liquid passes through the throttling ports 111, 115. With increasing compression stroke the throttling ports 111 are masked sequentially by the outer tube, so that increasingly a smaller total open cross-section is available. Since also the impact energy is increasingly dissipated, the damping force can be held constant over long lengths of stroke independently of the stroke.

The throttling port 115 increases the aperture area available upon a compression stroke, according to the extent to which it is covered by the disc 114. It is possible to arrange that the port 115 is masked at the end of the compression stroke just as the ports 111 are masked by the end of the outer tube 1.

Figure 2:
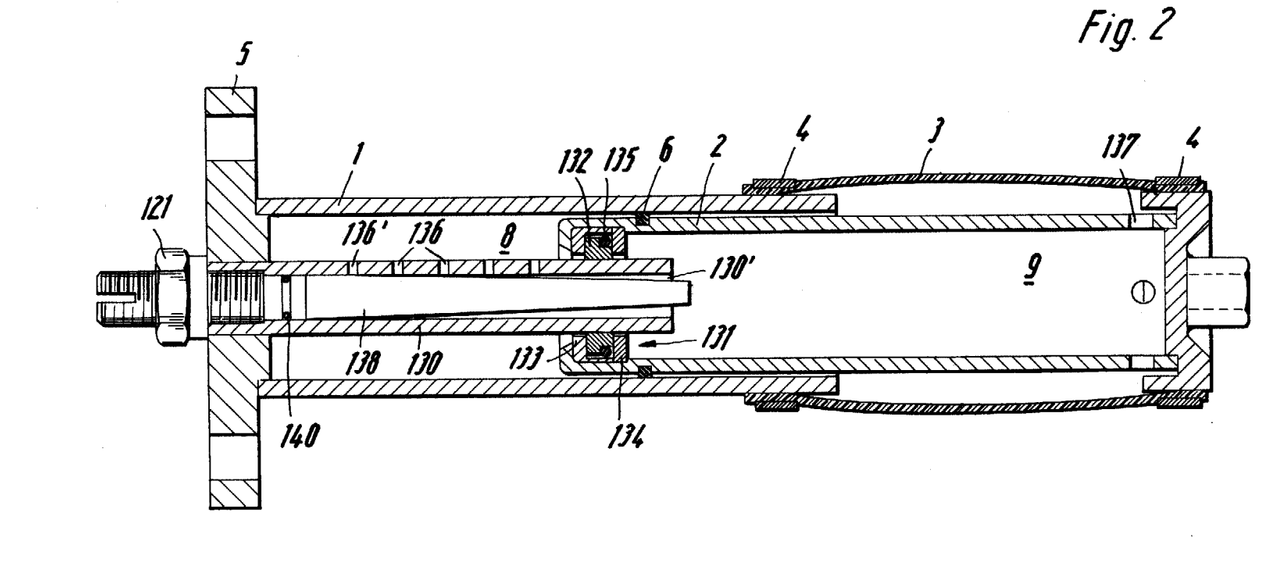
FIG. 2 is a similar sectional view of a shock absorber having a hollow control pin provided with throttling ports.

The shock absorber shown in FIG. 2 differs from FIG. 1 in that it has a control pin 130 carried by the fastening flange 5 of the outer tube 1. The control pin 130 engages in a control plate 131 at the inner end of the inner tube 2. The control plate 131 permits a separation of the inner chamber 8 of the outer tube from the inner chamber 9 of the inner tube. The pin 130 is floatingly guided by a guide ring 132 of the control plate, that is it is allowed to undergo small radial displacements. The guide ring 132 is arranged between two spacer rings 133, 134 which are compressed into the inner tube. The control plate has an axially sealing sealing ring 135 and covers the throttling ports 135 one after another on compression of the two tubes 1, 2 into one another. The damping liquid forced through the interior of the hollow control pin 130 from the inner chamber 8 into the inner chamber 9 flows through an overflow port 137 into the chamber 10 enclosed by the resilient bag 3.

Within the bore 130' of the hollow control pin 130 is arranged a control cone 138, one end of which can be screwed by means of a screw-thread 139 into the interior wall surface of the control pin 130. Here it forms, together with a seal 140, the liquid-tight end of the interior of the hollow control pin. Any particular set position is secured by the nut 121 which is tightened against the end flange 5 or the end of the control pin. The control cone 138 is arranged co-axially with the tubes 1, 2, and is adjustable in a longitudinal direction. Thus, the flow of the liquid through the port 136' nearest to the flange 5 or through one or more of the remaining ports 136 can be regulated to a greater or lesser extend. Since the inclination of the outer surface of the cone can be produced to any degree of accuracy consistent with the desired accuracy of adjustment, it follows that altering the axial position of the control cone has a sensitive influence on the damping properties, with the result that the shock absorber can be made not only softer but also harder. Here also, the setting member projecting from the fastening flange 5 can be protected against displacement or shocks, in case the impact is not introduced via the securing member 141.

Figures 3, 3A:
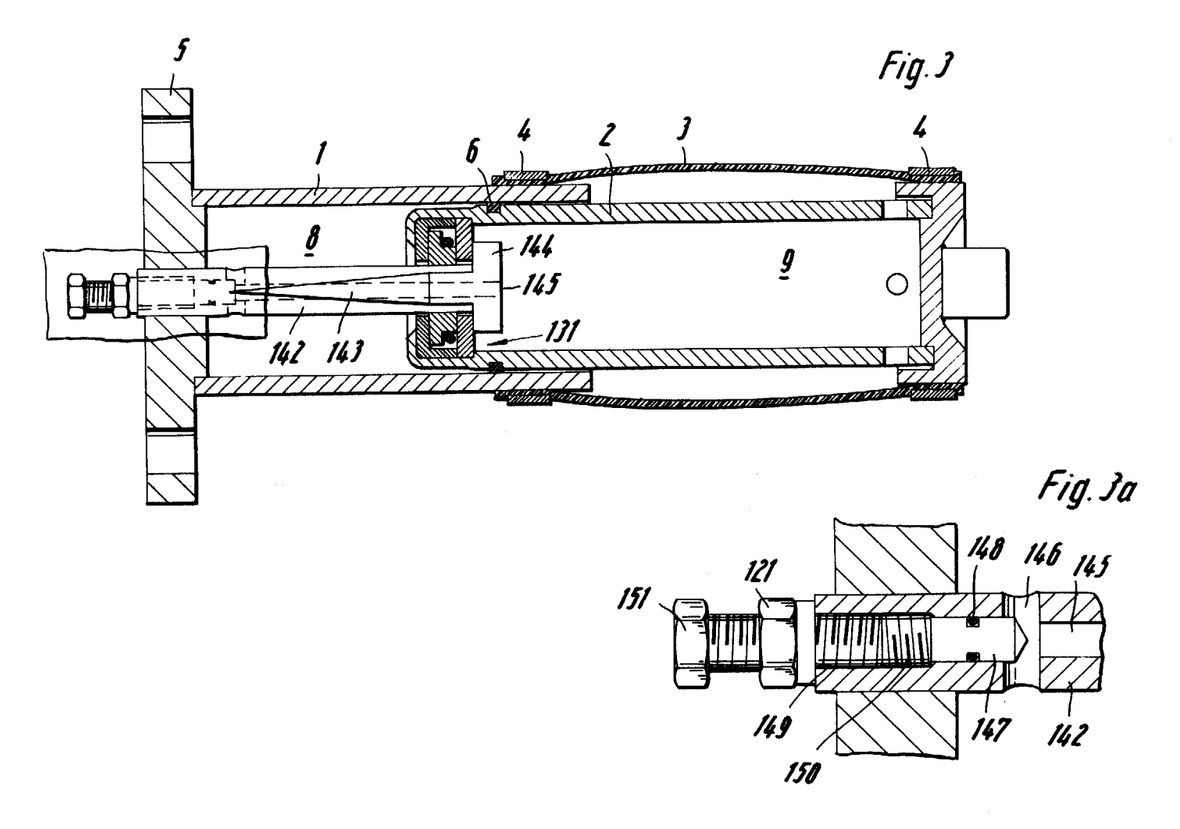
FIG. 3 is a longitudinal sectional view of a shock absorber with a control pin which has an internal by-pass.
FIG. 3a is a detail view of the setting member of FIG. 3 in the region of the headpiece of the outer tube.

The shock absorber illustrated in FIG. 3 basically corresponds in its construction to the shock absorber of FIG. 2. It is provided however with a special control pin 142 which together with the control plate 131 forms a liquid aperture whose size is determined by a flattening 143 on the surface of the control pin. When the two tubes 1, 2 are compressed the aperture cross-section decreases corresponding to the desired course of the damping action, until it becomes zero on completion of a maximum compression stroke. At the inner end of the control pin 142 there is an end stop 144 which prevents the tubes from being withdrawn from one another beyond the position illustrated, thus removing the load from the bag 3.

FIG. 3a shows on an enlarged scale the structure of the control pin 142 in the region where it passes through the fastening flange 5. The longitudinal bore 145 of the control pin connects the inner chamber 9 by means of a transverse bore 146 to the inner chamber 8. Its open cross-section is determined by a setting needle 147 which is arranged to be adjustable longitudinally in the outer end of the control pin 142 and closes off the end in a liquid-tight manner. For this purpose a sealing ring 148 is arranged in the needle in the region between the transverse bore 146 and the screw-thread 149 of the setting needle, the thread 149 engaging with a screw thread 150 internally of the control pin. The positioning of the needle is effected by means of a screw head 151 and the set position is secured by the nut 121. In the extreme positions, either the bore 145 is completely closed or the transverse bore 146 is opened at least to the bore 145 of corresponding cross-section.

Figure 4:
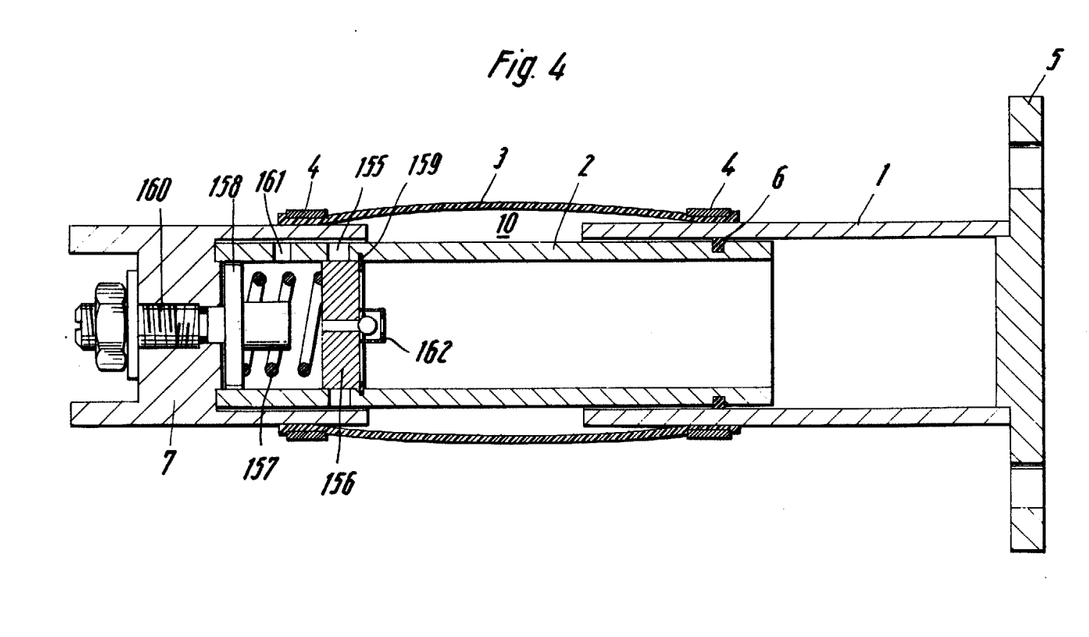
FIG. 4 is a longitudinal sectional view of a shock absorber with a throttling aperture which is only opened by a spring-loaded plate in the event of operation of the shock absorber.

The shock absorber illustrated in FIG. 4 has in its inner tube 2 near to the headpiece 7 an opening 155 which is completely masked by a disc 156 in the rest position of the shock absorber. The masking is achieved by the disc 156 being under pressure from a spring 157, which is supported at one end against the disc and at the other end against a setting plate 158. A spring ring 159 defines the maximum possible axial setting in the direction towards the outer tube 1. The position of the setting plate 158 is achieved by rotating the bearing shaft 160, which for example can be formed as in FIGS. 1 to 3a.

The smaller the distance between the disc 156 and the setting plate 158, the larger must be the shock energy of the impinging object. The tubes 1, 2 are pushed into one another until the shock energy is no longer sufficient to overcome the spring force. The opening 155 is then closed again.

A relief bore 161 connects the space between the disc and the setting plate with the inner chamber 10 of the resilient bag 3 and thus allows the compression-free displacement of the damping liquid enclosed in the spring space. In order that the disc 156, after uncovering the opening 155, returns to its initial stop position against the spring ring 159, a non-return valve 162 is provided.

Figures 5, 5A:
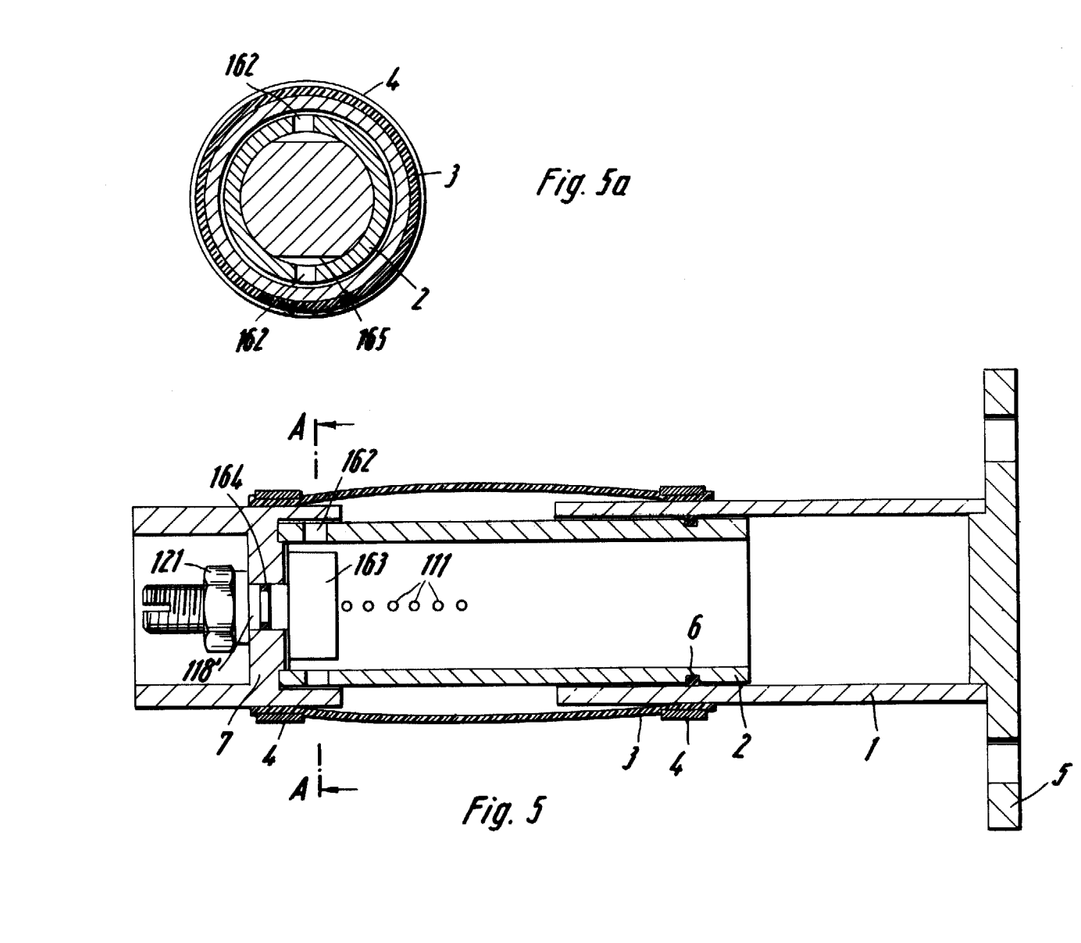
FIG. 5 is a longitudinal sectional view of a shock absorber similar to FIG. 1, but fitted with a rotatable setting disc.
FIG. 5a is a cross-section through the shock absorber of FIG. 5 along the line A—A.

In FIG. 5, in addition to the row of throttling ports 111 to be masked by the outer tube 1, there is also provided one or more ports 162 which are arranged to be covered by a rotatable disc 163 to a greater or lesser extent. The rotatable disc 163 lies against the inside face of the headpiece 7 and can transfer direct to the headpiece 7 the pressure forces arising upon compression of the tubes 1, 2. The setting accuracy is then not affected. In addition, the seal 164 is not under load. Any set position can be secured in the way described above by the nut 121. Since there are no axial displacements, and particularly since the bearing shaft 118' is not screw-fitted into the headpiece 7, this shock absorber is of comparatively short operational length. The setting of the free cross-section of the ports 162, which are hydraulically in parallel with the throttling ports 111, is effected by means of flattenings 165 of the rotatable disc as illustrated in FIG. 5a, the edges of the flat surfaces defining the extent to which the ports 162 are open. If these flattenings 165 are no longer in the region of the ports 162, then the by-pass is completely closed.

Figure 6:
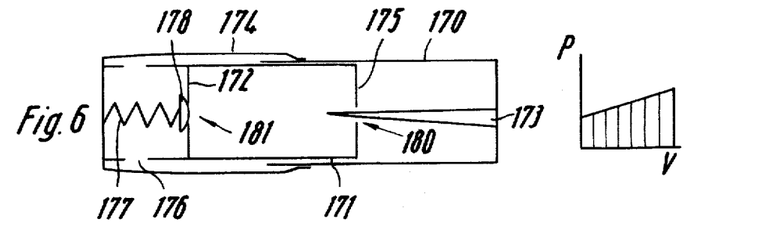
FIGS. 6, 6a and 6b schematically illustrate shock absorbers having a control pin, for example corresponding to FIG. 3, with a further liquid aperture or apertures in parallel and/or in series with the control pin aperture.

FIG. 6 shows schematically a shock absorber comprising two telescopically movable tubes 170, 171 which are closed by a resilient bag 174 to seal in the damping liquid. A control pin 173 fitted to the outer tube projects through a control plate 175 of the inner tube and so forms a throttling aperture 180 for the damping liquid upon compression of the two tubes. The control pin 173 and plate 175 may take the form as illustrated in FIG. 2 or FIG. 3 for example, with adjustable setting means controllable from externally of the outer tube 170. Alternatively, the control pin 173 and plate 175 may be constructed without provision for adjustment. The inner tube 171 has a further throttling aperture 181 which in the case of this construction is formed by an apertured transverse wall 172 and by a closure member 178 controlled by a spring 177. The part of the inner chamber containing the spring communicates through openings 176 with the chamber enclosed by the bag 174. The spring 177 and the closure member 178 may be constructed in a manner broadly similar to FIG. 4 with adjustable setting means effective on the spring and controllable from externally of the inner tube 171. Alternatively, the spring 177 and closure member 178 may be constructed without provision for adjustment. Upon compression of the two tubes the liquid is forced through the apertures 180 and 181 and then through the openings 176 into the resilient bag 174. The plot of the damping force P in relation to the compression speed v progresses as illustrated, i.e., only when the impact energy exceeds a certain value is the aperture 181 opened and then the damping force increases by a corresponding amount according to the control effected by the control pin 173. The components of damping force generated by the respective liquid apertures 180 and 181 are added together with this series arrangement of the apertures, as shown by the P, v diagram.

Figure 6A:
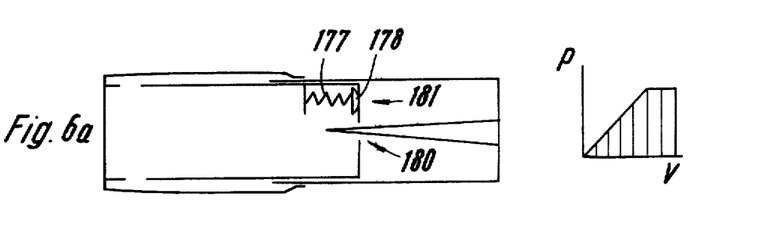

In FIG. 6a, the liquid aperture 181 is arranged in parallel with the liquid aperture 180, so that as a result the damping force is limited after an initial rise determined by the control pin. The spring 177 and closure member 178 operate as excess pressure valves, as can be seen from the P, v diagram.

Figure 6B:
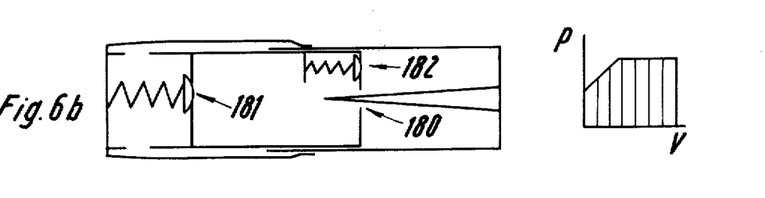

According to FIG. 6b the arrangements in FIGS. 6 and 6a are combined, and this correspondingly determines the damping properties, as can be seen from the P, v diagram associated with FIG. 6b. Here the shock absorber has three control apertures 180, 181 and 182.

It should be understood that shock absorbers acting in the way illustrated in FIGS. 6 and 6a can also be formed with slots or a plurality of throttling ports in a tube which are arranged to be sequentially masked, for example in the manner described in the embodiments referred to earlier, in order to improve or modify their damping properties.

We claim:

1. A hydraulic shock absorber comprising two telescopically engageable tubes containing damping liquid, a resilient bag disposed exteriorly of said tubes and attached to spaced-apart portions of said tubes in fluid-sealing engagement and encircling outer peripheral portions of said tubes interposed the points of bag attachment to said tubes so as to define a damping liquid storage chamber therewith, said storage chamber communicating with said damping liquid in said tubes by means of a throttling port whereby said damping liquid is received in said storage chamber during telescopic movement of one of said tubes into the other in the course of a tube compression stroke, and means for adjusting the effective fluid-conveying cross-section of the throttling port disposed adjacent said throttling port and extending sealingly from the interior of one of said tubes so as to be engageable exteriorly of said shock absorber; said resilient bag acting to return said damping fluid to said tubes through said throttling port and to return said tubes to the extended condition following said compression stroke.

2. A shock absorber according to claim 1, in which the adjusting means comprises a setting member arranged co-axially with the telescopically engageable tubes.

3. A shock absorber according to claim 1, in which the effective cross-section of said throttling port is dependent solely on the axial position of the adjusting means.

4. A shock absorber according to claim 1 in which the portion of said adjusting means engageable exteriorly of said shock absorber comprises screw adjustment means extending from the interior of one of said tubes and secured against rotation by means of a nut urged against an exterior surface portion of said tube member from which said adjusting means extends.

5. A shock absorber according to claim 1 in which the adjusting means includes a shaft portion which carries a sealing ring to prevent leakage of said damping liquid from the tube from which said adjusting means extends.

6. A shock absorber according to claim 1 in which the tube opening through which the adjusting means extends includes protective sleeve housing means encircling and extending the length of the adjusting means.

7. A shock absorber according to claim 1 in which said trottling port comprises an aperture in one of said tubes and the adjusting means comprises a spring loaded member which is operative to block said aperture.

8. The shock absorber of claim 1 in which said throttling port comprises an aperture in one of said tubes and the adjusting means comprises a spring loaded plate in said one tube connected to the adjusting means portion engageable exteriorly of said shock absorber, said portion being operative to alter the tension in the spring loading said plate.

9. A shock absorber according to claim 1 in which said spring loaded plate has an aperture therein, a check valve for said aperture preventing flow of damping fluid through said aperture in the course of a compression stroke of said telescoping tubes and permitting flow of damping fluid from said resilient bag to said telescoping tubes in the course of an extension stroke of said telescoping tubes.

* * * * *